June 10, 1952     M. D. WILSON     2,599,880
POWER TRANSMISSION MECHANISM
Filed April 20, 1949     2 SHEETS—SHEET 2
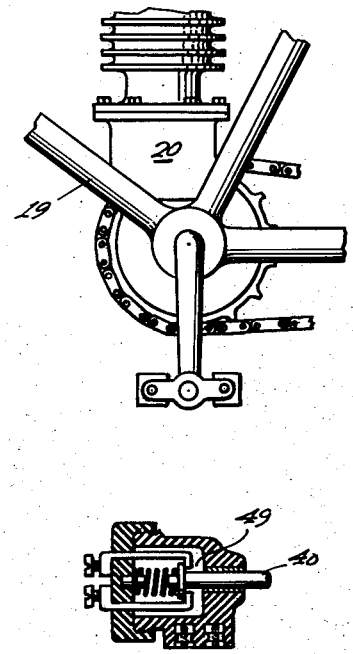
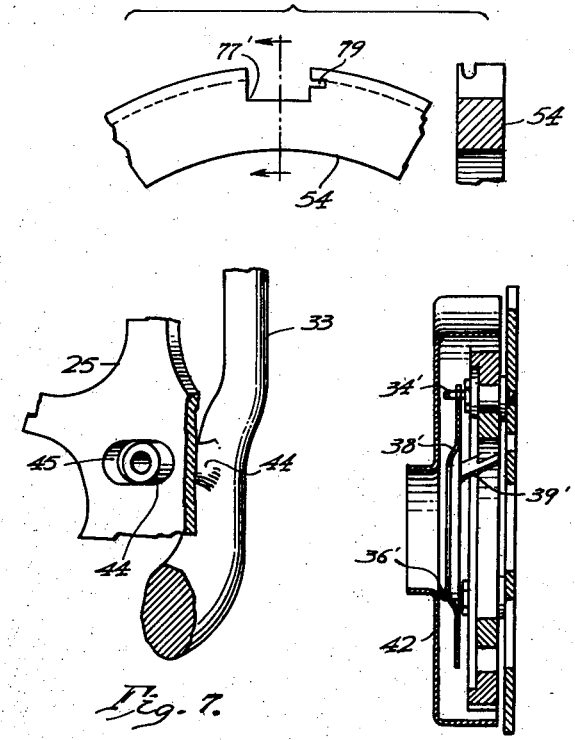
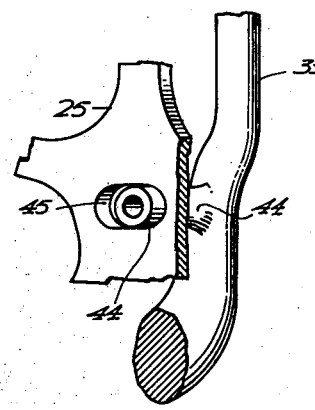
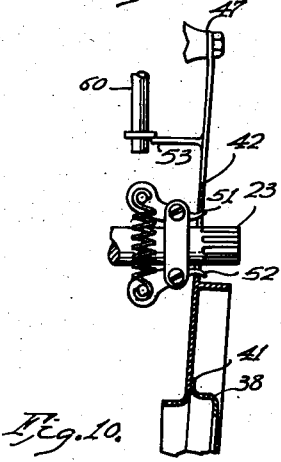
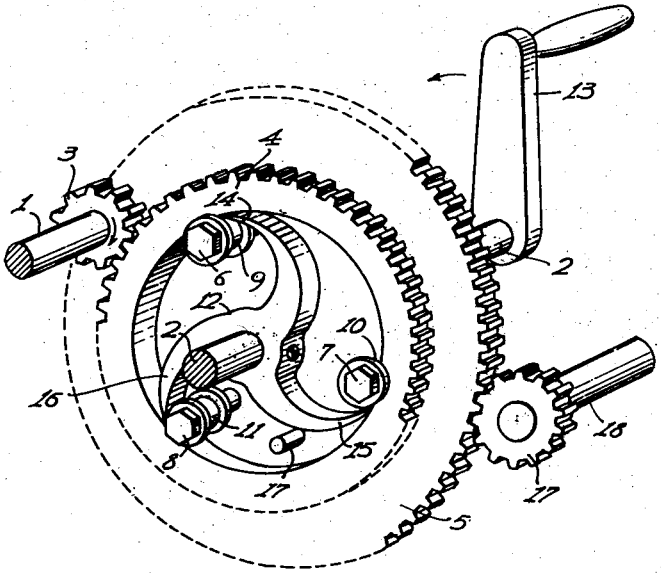
INVENTOR.
BY Merrideth D. Wilson.
Paul E. Friedemann Patented June 10, 1952

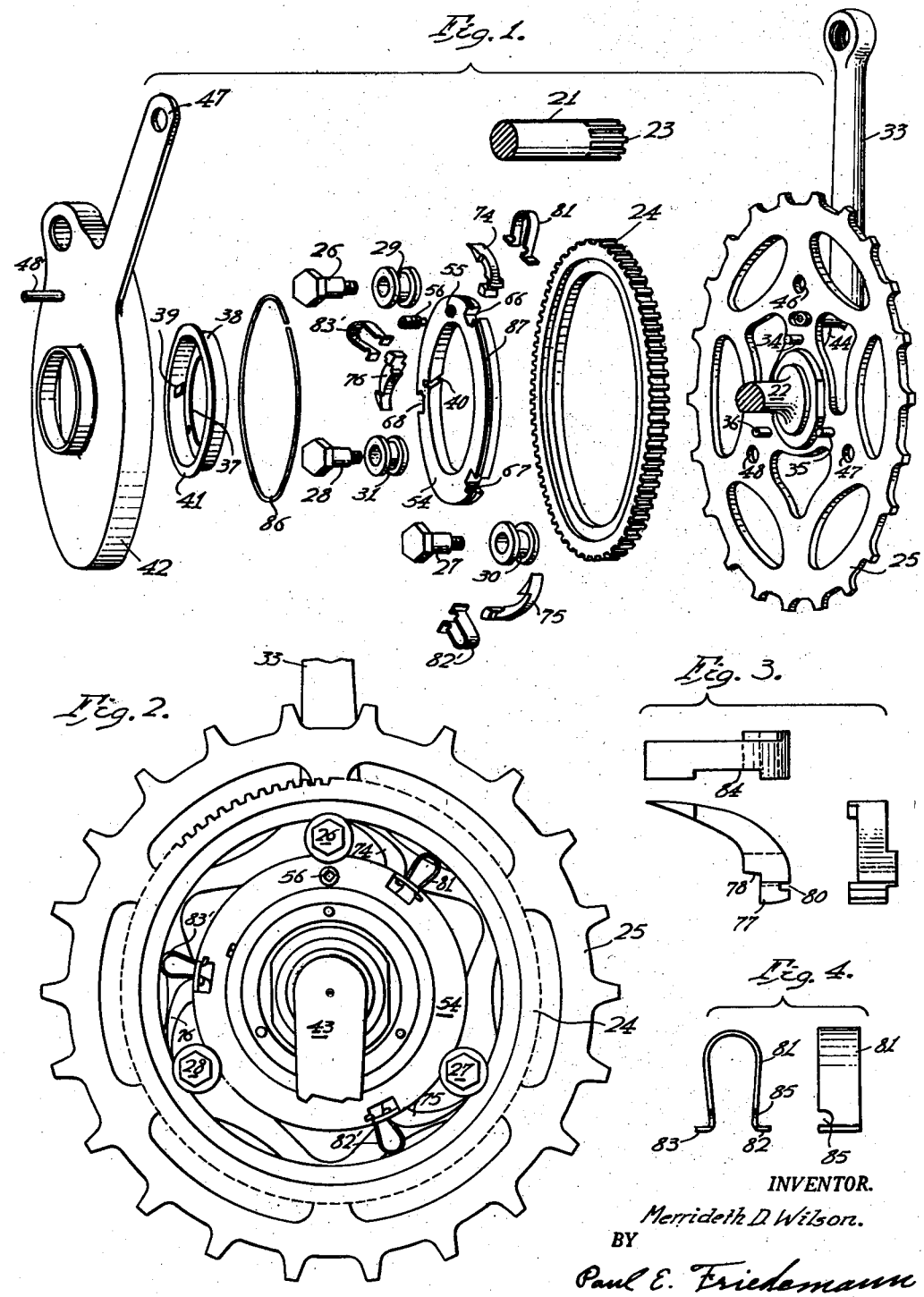

2,599,880

UNITED STATES PATENT OFFICE 2,599,880

POWER TRANSMISSION MECHANISM

Merrideth D. Wilson, Patton Township, Allegheny County, Pa.

Application April 20, 1949, Serial No. 88,593

11 Claims. (Cl. 74—625)

My invention relates to transmission mechanisms and more particularly to apparatus for transmitting power to a rotary shaft from two separate and distinct driving sources, or sources of power.

Many people find the bicycle an excellent apparatus for taking exercise. A bicycle is far more interesting than any exercising machine. One of its appeals is that the user actually gets somewhere. He can actually enjoy the scenery. A bicycle is, however, mainly a pleasant exercising machine only on level paths, roads, highways, etc.

One specific object of my invention is the provision of a transmission mechanism for a bicycle provided with an engine such that the engine may be used to help propel the bicycle but yet not in the least interfere with pedal propulsion of the bicycle.

Another specific object of my invention is the provision of transmission means for a bicycle having an engine by means of which the bicycle is propelled by the pedals so that the rider may use as much or as little energy as he likes and the engine may be caused to help by an amount determined by the rider.

A somewhat broader object of my invention is the provision of transmission mechanisms for driving a shaft from two prime movers which may assume the total driving load in any selected equal or unequal load divisions.

Another broad object of my invention is the provision of transmission means for driving a shaft from two prime movers in such manner that the load assumed by one prime mover may vary from a selected positive minimum value, which minimum does not include zero, to a selected positive maximum value and the load assumed by the other prime mover may be caused to vary similarly.

The objects hereinbefore stated are merely illustrative of the objects of my invention. Many other objects and advantages of my invention will become more apparent from a study of the following specification and the accompanying drawings, in which:

Figure 1 is an exploded view of the preferred embodiment of my invention;

Fig. 2 is a side view in assembled relation of the elements shown in Fig. 1, but with the cover not in place to thus better illustrate some of the details;

Fig. 3 shows three different views in considerable detail of certain wedging dogs used in my transmission mechanism;

Fig. 4 shows two views of the structure of the retaining springs for the dogs shown in detail in Fig. 3;

Fig. 5 is a fragmentary showing of the pedal-shaft region of a bicycle provided with my invention;

Fig. 6 shows two views of a broken away portion of a ring used in my transmission mechanism;

Fig. 7 is a broken out portion of the sprocket wheel and crank arm illustrating the loose connection between the two;

Fig. 8 shows a transverse sectional view of certain elements of my invention illustrating means for stopping the engine constituting one of the prime movers used with my invention;

Fig. 9 shows an electric switch in section, which switch is used for controlling the ignition circuit of the engine;

Fig. 10 shows some elements in detail for starting the engine; and

Fig. 11 illustrates, in a perspective view, a modification of my transmission mechanisms.

For a more thorough understanding of the details and merits of the preferred embodiment of my invention, a study first of the modification shown in Fig. 11 may be most helpful. This is believed to be so because the modification shown in Fig. 11 illustrates my invention both in its broadest as well as simplest aspects.

In Fig. 11, the driving power of one prime mover, not shown, is coupled to shaft 1, whereas the driving power of the other prime mover, represented by crank 13, is coupled to shaft 2. In use, shaft 1 rotates clockwise to thus drive the pinion 3 clockwise. Since the pinion 3 meshes with the ring gear 4, this ring gear 4 is driven counterclockwise.

The gear 5 rotates on a suitable bearing on shaft 2, that is, shaft 2 and gear 5 have free relatively rotary motion. The front face of gear 5, as seen in Fig. 11, is provided with three stub shafts 6, 7 and 8 generally in the shape of bolts rigidly threaded into the gear 5. Each stub shaft carries a spool-like roller, as the rollers 9, 10 and 11. The disposition of the stub shafts is such that the ring gear 4 rotates freely on the rollers 9, 10 and 11 and is guided between the flanges of the rollers.

As an engine or other prime mover rotates shaft 1 in the direction indicated, the ring gear 4 rotates freely on the rollers without transmitting any power to the gear 5. The engine thus idles and runs at idling speed.

The shaft 2 carries the spider 12 which spider is rigidly secured to shaft 2. In normal use the shaft 2 is caused to operate counterclockwise by the actuation of the crank arm 13. This crank arm 13 may be actuated manually or be foot operated, as would be the case if this modification were used on a bicycle. The spider 12 is provided with three wedging dogs 14, 15 and 16. These dogs in close, almost touching, proximity to the inner surface of the ring gear 4, terminate in relatively sharp, preferably somewhat resilient, wedges.

Instead of being the type of wedges shown the outer ends may comprise elements pivoted on the main portion 12. Each arm of the spider, for this modification, is provided with a bearing pin on which the wedge-like end is pivoted and a pre-loaded spring is mounted in operative relation to the bearing pin, wedge and spider and urges the sharp end of the wedge against the inner surface of the gear 4. The springs provide for load equalization between the wedges.

From the structure and disposition of the wedging dogs, it is apparent that rotation of shaft 2 in the direction indicated at a speed greater by an amount ever so small than the counterclockwise speed of ring gear 5 will cause the wedging dogs to move between the rollers 9, 10 and 11 and the inner surface of the ring gear 4. On a bicycle the sprocket corresponds to gear 5 and during coasting does not rotate. The function of the wedges is still the same. The ring gear 4 will thus be operatively coupled to the gear 5, since this gear 5 carries the stub shafts 6, 7 and 8 and the shaft 2 will also be coupled to the gear 5. Since gear 5 meshes with the driven pinion 17 rigidly secured to the driven shaft 18, it is apparent that the power of both prime movers, the one coupled to shaft 1 and the one coupled to shaft 2, is effective in driving the shaft 18.

If the transmission shown in Fig. 11 is to be used on a bicycle, then the gear 5 may be the main sprocket wheel. When the rider stops pedaling the coupling is not active. The wheel 5 is thus free on shaft 2. The pin 17' rigidly secured to the gear 5, considering this gear as the main sprocket, engages the back of one of the wedging dogs and braking may be effected in the regular manner through the coaster brake.

My device has general utility but since its principal application is probably on a bicycle, I shall describe the preferred embodiment in connection with the usual propulsion mechanisms of a bicycle.

In Fig. 5, the frame 19 of the bicycle is shown as carrying the internal combustion engine 20. This engine 20 is coupled to drive the shaft 21, see Fig. 1. For the particular showing, the direction of rotation of shaft 21 is clockwise. The other driving shaft is the main bicycle propulsion shaft 22 connecting the crank, or pedal arms 33 and 43. The shaft 21 carries the pinion 23 as a rigid part of the shaft. The pinion 23 meshes with the ring gear 24 and this gear 24 is thus normally driven counterclockwise when the engine 20 is in operation.

The sprocket 25 is disposed on the shaft 22 so that it has relative rotary motion. This motion is, however, not of unlimited freedom because the crank arm 33 is provided with a stud-like projection 44 normal to the plane of the sprocket 25. See Fig. 7. The sprocket 25 is provided with the arcuate slot 45 through which the projection 44 extends. The forward end of the projection is provided with an axial hole, the utility of which will become apparent presently.

The sprocket 25 is provided with three threaded holes 46, 47 and 48 placed at the apices of an equilateral triangle. The holes are disposed symmetrical with reference to the shaft 22. Three stud bolts, or stub shafts, 26, 27 and 28, are rigidly threaded into the holes 46, 47 and 48, respectively. These shafts 26, 27 and 28 carry the spool-like rollers 29, 30 and 31, respectively.

The inner somewhat narrower surface of the ring gear 24 is disposed to roll freely on the rollers 29, 30 and 31 and the ring 54 is disposed to fit between the inner flanges of the rollers 29, 30 and 31. This ring 54 may thus rotate on the rollers. The ring 54 is provided with a threaded opening 55 to receive the threaded stud bolt 56. The threads are made to bind so that once the bolt 56 is screwed in so that its forward end is flush with the forwar dsurface of the ring 54, there is little likelihood for the bolt 56 to come out. The rear end of the bolt 56 is provided with smooth axial projection of diametrical dimensions to snugly fit into the axial hole in the projection 44. See Fig. 7.

From the foregoing description, it is apparent that the ring 54 moves in rotation in unison with shaft 22, but since the sprocket 25 is provided with the arcuate slot 45, the sprocket has limited rotary motion on shaft 22.

The ring 54 is provided with the notches 66, 67 and 68, into which the wedging dogs 74, 75 and 76 are pivotally mounted. These dogs are shown in considerable detail in Fig. 3. The lower rather sharp corner 77 is made to fit into the left-hand corner 77' of the notch with which it coacts. The ledge 78 is made to rest on the outer circumference of the ring 54. The right-hand radial surface of each notch is provided with a groove 79. The wedging dogs are each provided with similar grooves 80.

U-shaped springs 81, 82' and 83' having the feet 82 and 83 at the bottom of the legs are so disposed that foot 83 of each spring fits into groove 80 of each dog and foot 82 of each spring fits into groove 79 of the notches in ring 54. The springs are under some stress to firmly hold the dogs with which they coact in the position shown in Fig. 2.

The dogs are notched at the front, as shown at 84, and the springs are also notched, as shown at 85, so that a C-ring 86 may be placed in the groove 87 to hold all three dogs 74, 75 and 76 and all the springs 81, 82' and 83' in the position shown in Fig. 2.

Assuming for the moment that the engine 20 is driving the shaft 21 and thus the pinion 23 and the gear 24 and that the cyclist is coasting along on the level at a relatively slow speed and then, either to negotiate a rise in the path or to increase his speed, he begins to pedal. In so doing, he operates the ring 54 counterclockwise with reference to the sprocket 24 and as a result the wedging dogs 74, 75 and 76 move between the inner surface of the ring gear 24 and the rollers 29, 30 and 31. The ring gear 24 is thus locked, or coupled to the ring 54 and as a result both the engine 20 and the cyclist propel the bicycle. If the arrangement is such that the engine is stopped during coasting, then starting of the pedal may also start the engine. Some more on this will appear hereinafter.

The cyclist is free to assume as much of the load as he likes and the engine speed may be adjusted from the throttle by any amount desired within the capacity range of the engine. Since the fun of cycling is to be retained, it is, of course, clear that the engine may be one of rather small capacity and thus small weight. The total weight added to the bicycle by my equipment is thus a relatively small part of the weight of the cyclist and bicycle. Since the engine is rather small, throttle control may not be needed but instead the throttle is left full open.

For the users I have in mind for the engine mounted on the bicycle, it will usually be desirable to stop the engine when coasting down a long grade. To this end I provide the sprocket with three stud pins 34, 35 and 36 disposed to fit into three openings in the radial flange 37 of the sleeve 38. This sleeve 38 is provided with a knock-out type radial projection 39 disposed in a plane intersecting the axis of shaft 22. This projection fits into a groove 40 disposed in similar relation to the axis of shaft 22.

When the cyclist wishes to stop the engine, he merely moves the pedals in the braking direction, whereupon the ring 54 moves counterclockwise and as a result the radial projection 39 coacting with the groove 40 causes the sleeve 38 to move toward the left. The radial flange 41 thus engages the cover 42 pivoted at 47 on the frame 19. The cover moves toward the left to engage the stem 48 of the switch 49. The ignition circuit is thus opened and the engine stops. As soon as the engine has stopped, the coasting is continued in silence.

During the stopping of the engine, the cover 42 swings out as shown in Fig. 10. Since the shaft 21 is operating at full engine speed, the centrifugal device 50 will hold the dogs 51 and 52 flat against the shaft 21. The instant the engine has stopped, the dogs 51 and 52 move to the position shown to hold the cover in the position shown.

The cover may and preferably will be provided with means 53 for holding the compression valve 60 of the engine 20 open. This operation will stop the engine. Ignition switch control will then not be needed. This method of stopping is usually used where engine uses a magneto.

When the cyclist again wishes to propel the bicycle, he merely begins to pedal and in consequence to dogs 74, 75 and 76 again couple gear 24 to the sprocket 25. The result is that the engine is cranked by the rotation of the shaft 21 effected by the rotation of gear 24. The engine starts and the instant the speed of shaft 21 is sufficiently high, then the valve 60 is released and in consequence the engine assumes its load.

Fig. 8 merely shows a modified structure for effecting stopping of the engine by movement of the cover 42. In this showing, the stud bolts 26, 27 and 28 are provided with axial pins 34', 35' and 36', respectively. These pins fit into suitable holes in the disc member 38' having the angular projection 39' fitting into the groove 40. Upon movement of the ring 54 in the reverse direction, the disc member 38' moves to the left and actuates the cover 42.

I have not shown the details of the ignition circuit, nor details of the valve stem 60 in relation to the engine, nor some other elements mentioned because all these elements are well known in the art and in themselves form no part of my invention.

While I have shown and described but few embodiments of my invention, I do not wish to be limited to the showings made nor the detailed descriptions given but only by such limitations as are determined by the scope of the claims hereto appended.

I claim as my invention:

1. In a transmission system, in combination, a driving shaft having a pinion thereon, a ring gear meshing with the pinion, a driven gear carrying a plurality of rollers on the face thereof, said ring gear being rotatably mounted on the rollers to rotate in concentric relation to the driven gear, a second driving shaft, and wedge means secured to the second driving shaft and disposed for movement between the rollers and ring gear to thus rotatably fix the ring gear to the second driving shaft and the driven gear, whereby both driving shafts are operatively coupled to the driven shaft when the wedge means are actuated.

2. In a transmission system, in combination, a driven gear, three stub shafts projecting at right angles from the face of the driven gear and being disposed at equal distances from the axis, a roller rotatably mounted on each of the stub shafts, a driving gear rotatably mounted on said rollers on the same axis with the driven gear, a driving shaft, wedge means coupled to the driving shaft, said wedge means being disposed to wedge between the rollers and driving gear to thus operatively couple the driving gear and driving shaft to the driven gear upon movement of said wedging means between the rollers and the driving gear.

3. In a transmission system, in combination, a first rotatable driving means, a second rotatable driving means disposed concentric of the first, a rotatable driven means disposed to rotate about the same center as the two driving means but disposed between the two driving means, and clutching means, having elements mounted on the second rotatable driving means and elements mounted on the driven means, operable to couple the two driving means to the driven means upon a positive actuation of the second driving means to attempt of a more rapid rotation of the second driving means than the rotation of the first driving means.

4. In a transmission system, in combination, a driving shaft, a driven shaft, a second driving shaft, a spur gear rotatably mounted on the second driving shaft, a pinion on the driven shaft meshing with the spur gear, three stub shafts projecting at right angles from one side of the spur gear, said stub shafts having their axes at equal distances from the axis of the second driving shaft, a roller disposed on each of the stub shafts, a ring gear disposed about the rollers to be rotatably mounted on the rollers, a spider rigidly secured to the second driving shaft, a pinion on the first driving shaft meshing with the ring gear, and wedging dogs so disposed on the spider that movement, upon rotation of the second driving shaft in a given direction and with reference to the spur gear, operatively locks the two driving shafts to the driven shaft.

5. In a transmission system, in combination, three normally uncoupled concentrically disposed rotary elements, two of said elements being driving elements and the third being a driven element, means for coupling the driving elements to two separate prime movers, and interacting clutching means mounted on one of the driving means operative, upon any tendency of a more rapid rotation of one of the driving elements than the rotation of the other driving element, to couple both driving elements to the driven element.

6. In a transmission gear, in combination, a pair of driving shafts, one of said shafts carrying a pinion and the other a spider with a plurality of wedging dogs, a driven gear, a ring gear meshing with said pinion, a plurality of stud shafts projecting from the side of the driven gear to thus be in parallel relation and symmetrically disposed about the axis of the driven gear, a spool-like roller on each of said stud shafts, said ring gear being disposed to rotate freely on the rollers and be guided by the flanges of the spool-like rollers, said spider being so disposed coaxially of the driven gear that operation of the other driving shaft positions the wedges between the rollers and ring gear to couple both driving shafts to the driven gear.

7. In a transmission system, in combination, a driving shaft, a torque transmitting wheel loosely mounted for rotation on the shaft, a driving element coupled to the shaft, a ring gear, said driving element including a plurality of wedge-like dogs for interlocking the ring gear with the driving element, a pinion meshing with the ring gear, a shaft for the pinion whereby the torque transmitted from the shaft carrying the pinion and the torque transmitted by the driving shaft are through said element coupled to drive the torque transmitting wheel.

8. In a transmission system, in combination, a driving shaft, a torque transmitting wheel loosely mounted for rotation on the shaft, means for limiting the rotary motion of the wheel on the shaft, a driving element coupled to the shaft, a ring gear, said driving element including a plurality of wedge-like dogs for interlocking the ring gear with the driving element, a pinion meshing with the ring gear, a shaft for the pinion whereby the torque transmitted from the shaft carrying the pinion and the torque transmitted by the driving shaft are through said element coupled to drive the torque transmitting wheel.

9. In transmission gears, in combination, a shaft coupled to be driven by an engine, a pedal operated shaft, a ring gear, a pinion mounted on the engine driven shaft and meshing with the ring gear, said pedal operated shaft being disposed concentric of the ring gear, a ring smaller than said ring gear disposed concentrically of the ring gear and rigidly coupled to the pedal operated shaft, a driven wheel mounted for limited rotary motion on the pedal operated shaft, a plurality of rollers mounted on the driven wheel to be disposed in the annular space between the ring and the ring gear, and means on the ring for coupling the ring gear to the rollers to thus couple both the engine driven shaft and the pedal operated shaft to driven wheel.

10. In transmission gears, in combination, a shaft coupled to be driven by an engine, a pedal operated shaft, a ring gear, a pinion mounted on the engine driven shaft and meshing with the ring gear, said pedal operated shaft being disposed concentric of the ring gear, a ring smaller than said ring gear disposed concentrically of the ring gear and rigidly coupled to the pedal operated shaft, a driven wheel mounted for limited rotary motion on the pedal operated shaft, a plurality of rollers mounted on the driven wheel to be disposed in the annular space between the ring and the ring gear, a plurality of wedge-like dogs pivotally mounted on the ring, springs engaging the dogs and ring for urging the wedge edges against the inner surface of the ring gear, whereby operation of the ring in the direction of the rollers causes the wedge-like dogs to couple the driven wheel to both the pedal actuated shaft and the engine actuated shaft.

11. In transmission gears, in combination, a shaft coupled to be driven by an engine, a pedal operated shaft, a ring gear, a pinion mounted on the engine driven shaft and meshing with the ring gear, said pedal operated shaft being disposed concentric of the ring gear, a ring smaller than said ring gear disposed concentrically of the ring gear and rigidly coupled to the pedal operated shaft, a driven wheel mounted for limited rotary motion on the pedal operated shaft, a plurality of rollers mounted on the driven wheel to be disposed in the annular space between the ring and the ring gear, a plurality of wedge-like dogs mounted on the ring so that the wedge edge rides against the inner circumference of the ring gear in close proximity of the rollers, whereby operation of the ring in the direction of the rollers couples the driven wheel to both the engine driven shaft and the pedal operated shaft.

MERRIDETH D. WILSON.

REFERENCES CITED

The following references are of record in the file of this patent:

UNITED STATES PATENTS

| Number | Name | Date |
|---|---|---|
| 667,062 | Clemens | Jan. 29, 1901 |
| 675,388 | Keating | June 4, 1901 |
| 1,257,711 | Johnson | Feb. 26, 1918 |
| 2,202,187 | Chalette | May 28, 1940 |
| 2,221,962 | Bergfors | Nov. 19, 1940 |
| 2,419,998 | Johnson | May 6, 1947 |
| 2,498,047 | Myers | Feb. 21, 1950 |
| 2,529,919 | Cunningham | Nov. 14, 1950 |

FOREIGN PATENTS

| Number | Country | Date |
|---|---|---|
| 356,694 | France | Oct. 13, 1905 |